United States Patent

Garodnick et al.

[11] Patent Number: 6,014,405
[45] Date of Patent: Jan. 11, 2000

[54] SPREAD SPECTRUM MULTIPATH RECEIVER WITHOUT A TRACKING LOOP

[75] Inventors: Joseph Garodnick, Centerville, Mass.; Donald L. Schilling, Sands Point, N.Y.

[73] Assignee: Golden Bridge Technology, Inc., West Long Branch, N.J.

[21] Appl. No.: 08/957,733

[22] Filed: Oct. 24, 1997

[51] Int. Cl.[7] .................................................. H04B 15/00
[52] U.S. Cl. ..................... 375/200; 375/207; 375/208; 375/347
[58] Field of Search ..................................... 375/200, 206, 375/207, 208, 343, 347, 367, 267

[56] References Cited

U.S. PATENT DOCUMENTS

| | | | |
|---|---|---|---|
| 4,621,365 | 11/1986 | Chiu | 375/208 |
| 4,630,283 | 12/1986 | Schiff | 375/207 |
| 4,653,069 | 3/1987 | Roeder | 380/31 |
| 5,081,643 | 1/1992 | Schilling | 375/200 |
| 5,109,390 | 4/1992 | Gilhousen et al. | 370/335 |
| 5,166,952 | 11/1992 | Omurg et al. | 375/200 |
| 5,177,765 | 1/1993 | Holland et al. | 375/368 |
| 5,311,544 | 5/1994 | Park et al. | 375/206 |
| 5,349,606 | 9/1994 | Lovell et al. | 375/206 |
| 5,692,018 | 11/1997 | Okamoto | 375/347 |
| 5,778,022 | 7/1998 | Walley | 375/206 |
| 5,832,028 | 11/1998 | Durrant et al. | 375/208 |
| 5,856,998 | 1/1999 | Durrant et al. | 375/208 |

*Primary Examiner*—Stephen Chin
*Assistant Examiner*—Chieh M. Fan
*Attorney, Agent, or Firm*—David Newman; Chartered

[57] ABSTRACT

An improvement to a receiver for receiving multiple rays, due to multipath, of a received spread-spectrum signal having a chip-sequence signal with a chip rate embedded therein. The received spread-spectrum signal is sampled by an analog-to-digital converter at approximately twice the chip rate and then the samples are shifted in a shift register. The shift register shifts the chips of the underlying chip-sequence signal at approximately twice the chip rate. A matched filter includes an adder tree which, in cooperation with the shift register, forms an impulse response matched to the chip-sequence signal. The adder tree detects initially the chip-sequence signal embedded in the first ray, and outputs a first correlation signal. The adder tree then detects the chip-sequence signal embedded in the second ray, and outputs a second correlation signal. The adder tree continues to detect the chip-sequence signal of subsequent rays, and outputs subsequent correlation signals. A combiner combines each of the correlation signals using maximal-ratio combining. No tracking loop is required even though the chip clock and the sampling clock have slightly different frequencies.

10 Claims, 3 Drawing Sheets

SPREAD SPECTRUM MULTIPATH RECEIVER WITHOUT A TRACKING LOOP

BACKGROUND OF THE INVENTION

This invention relates to direct sequence spread-spectrum communications, and more particularly to maintaining synchronization to a chip-sequence signal in a multipath environment, without requiring multiple acquisition and/or tracking loops for acquiring and tracking a chip-sequence signal from multiple rays of the multipath.

DESCRIPTION OF THE RELEVANT ART

In a multipath environment a RAKE system can be used for combining the signal power from two or more rays arriving from two or more paths, respectively, of a received spread-spectrum signal. The RAKE system typically employs separate receivers, each having its own tracking loop, for receiving each ray of a multipath signal.

In a RAKE system using selection diversity, assume that a first correlator of the RAKE system receives a ray having the strongest signal strength, and data are demodulated using the first correlator. Assume that a second correlator of the RAKE system initially searches for and receives a second ray having a signal strength less than the first ray. When the first ray disappears or becomes weaker than the second ray, then the RAKE system changes from demodulating data by the first correlator to demodulating data by the second correlator. The first correlator then is used to receive a ray having a signal strength less than the second ray, which is currently being received by the second correlator. The RAKE system changes from the second correlator to the first correlator when the signal strength of the second ray becomes less than the signal strength of the first ray.

In a RAKE system using maximal-ratio combining, data from the first correlator and data from the second correlator are added, in proportion to their signal-to-noise ratio (SNR). There should be a sufficient number of receivers to receive all the significant multipaths.

A problem with the RAKE multipath system is that a tracking loop, such as a delay locked loop (DLL), is required for each correlator. This loop adjusts the timing of the sampling point on the chip. If a single tracking loop were used, then the sampling time dictated by the DLL is adjusted using all of the received rays. When switching between the received rays, such as from a first ray to a second ray, the common tracking loop does not switch but, instead, loses lock. In voice, this might result in a click, which can often be squelched, but in data communications, the loss in lock might result in loss of not only data, but the entire frame synchronization if the data is organized into fixed packets.

Spread-spectrum systems usually employ a tracking loop to ensure that the incoming chips are sampled at the peak. Sometimes chip oversampling is employed, but a tracking loop typically is used to ensure that the incoming chip rate and the local chip rate operate at the same rate. The two rates may initially differ by 10 or 30 parts per million (ppm). When a mobile terminal is involved, the clock rates will continually change due to Doppler frequency shift. The faster the mobile terminal is moving, the more the frequency offset.

When multipath is present, some designs use a different tracking system for each multipath since each multipath may have a slightly different clock rate due to Doppler shifts. Prior approaches to the multipath problem do not present solutions where data integrity may be maintained without using one or more tracking loops.

In a multipath environment, for example, with a spread-spectrum signal having a chip-sequence signal with a chip rate of 10 megachips per second (Mcps), one chip is equivalent to approximately 100 feet. Assume that the multipath environment has two paths, with a first ray arriving from a first path, and a second ray arriving from the second path. If the second ray traveled a path which is 100 feet longer than the first ray, then the chips in the second ray arrive at the RAKE system with a delay of one chip, compared with the first ray. If the RAKE system were implemented digitally, with one sample per chip, and the first ray were sampled in the middle of a chip, then the second ray, arriving with a one chip delay, would also be capable of being sampled.

However, suppose the second ray arrived with a path difference of 150 feet compared with the first ray. In this situation the RAKE system does not "see" the second ray because the sample from the second ray is at a transition between chips and not on a chip. This problem of not "seeing" the second ray is due, in part, to undersampling, i.e., sampling below the Nyquist rate. Thus, a delay-locked loop for receiving the second ray does not lock onto the second ray. This problem occurs, for example, if the second ray is $\pm 0.5, \pm 1.5, \pm 2.5, \pm 3.5, \pm 4.5, \ldots$, chips away from the first ray.

Further, since there is typically only one clock for the chip-sequence signal, the received waveform is clocked at a regular rate, maintained constant by a DLL tracking system. This is true, regardless of the number of samples/chip. The DLL tracking system locks to either the strongest multipath or some combination of the multipaths. If the strongest multipath disappears, the DLL tracking system remains fixed to the old sampling times, sometimes for an extended period, rather than moving immediately to the new, correct position.

The typical alternative to solving this problem is to employ multiple tracking loops, one for each RAKE finger, and to bear the expense of the multiple DLL's.

SUMMARY OF THE INVENTION

A general object of the invention is to receive a spread-spectrum signal in a multipath environment.

Another object of the invention is a spread-spectrum receiver for receiving multipath which does not rely on a tracking loop.

According to the present invention, as embodied and broadly described herein, an improvement to a receiver for receiving a plurality of rays, due to multipath, of a spread-spectrum signal, is provided. A received spread-spectrum signal, as used herein, is a spread-spectrum signal arriving at the input of the spread-spectrum receiver.

The received spread-spectrum signal is assumed to include a plurality of packets. Each packet has a header followed in time by data. The header and data are sent as a packet, and the timing for the data in the packet is keyed from the header. The data may contain information such as digitized voice, video, and other data, along with signaling, adaptive power control (APC), cyclic-redundancy-check (CRC) code, etc.

The header, or preamble, is generated from spread-spectrum processing a header-symbol-sequence signal with a chip-sequence signal. The data part of the packet is generated from spread-spectrum processing a data-symbol-sequence signal with the chip-sequence signal. The chip-sequence signal for spread-spectrum processing the header-symbol-sequence signal and the data-symbol-sequence signal do not have to be the same.

The present invention provides an improvement to a receiver for receiving multiple rays, due to multipath, of a received spread-spectrum signal having a chip-sequence signal with a chip rate, $f_c$. The multiple rays include at least a first ray and a second ray, although the receiver of the present invention also works if there were no multipath present.

The receiver improvement includes an analog-to-digital converter, a matched filter, a storage register and a combiner. The matched filter includes a shift register and an adder tree.

The analog-to-digital converter samples the received spread-spectrum signal at at least twice an approximate chip rate, $2 f_c$, or at least two samples per chip. Although the principles and advantages of multiple sampling hold true for more than two samples per chip, for clarity purposes, twice the approximate chip rate serves to explain the invention by way of example.

The shift register, which is as wide as the resolution of the analog-to-digital converter, shifts the chips of the chip-sequence signal at $2 f_c$ which is twice the approximate chip rate. The shifted chips of the chip-sequence signal are samples derived from the analog-to-digital converter. For example, if the analog-to-digital converter is of the four bit type, the shift register is also four bits wide, one for each analog-to-digital bit. The adder tree, in cooperation with the shift register, forms a matched filter which has an impulse response matched to the chip-sequence signal.

Assume that, due to multipath, multiple rays arrive at the receiver. When the first ray has the chip-sequence signal aligned in every other "odd" register (e.g., the odd-number registers: 1, 3, 5, . . . ) of the shift register, then the adder tree detects a first correlation signal and the storage register stores the first correlation signal. At this time, part or all of the chips of a second ray may be in the alternate registers (e.g., the even-number registers: 2, 4, 6, . . . ) of the shift register. One clock cycle later, which is a delay of one half chip from the first ray, when the chips of a second ray are aligned in every other "odd" register of the shift register, the adder tree detects a second correlation signal. A combiner combines the first correlation signal and the second correlation signal using maximal-ratio combining. This process continues for all the rays that can be detected in all the positions of both the even and odd registers.

A second embodiment of the present invention provides an improvement to a receiver including a first analog-to-digital converter, a second analog-to-digital converter, a first matched filter, a second matched filter and a combiner. The first analog-to-digital converter samples the received spread-spectrum signal, which is arriving at the receiver, at the approximate chip rate, $f_c$, of one sample per chip.

The first matched filter includes a first shift register and a first adder tree. The second matched filter includes a second shift register that is clocked at a half chip delay from the first shift register and a second adder tree. The two matched filters detect outputs. The outputs may be from one, two, three, four or more rays due to multipath.

The received spread-spectrum signal is assumed to arrive at the receiver having multiple rays due to multipath. The chip-sequence signal, having a chip rate, $f_c$, is embedded in the received spread-spectrum signal. The first matched filter, by virtue of the first adder tree and the first shift register working cooperatively, has an impulse response matched to the chip-sequence signal.

The chips of the chip-sequence signal are shifted through the first shift register at an approximate chip rate, $f_c$. In response to the first ray having the chip-sequence signal aligned in the first shift register as determined by the header, the output of the first adder tree is stored, thereby detecting a first correlation signal.

The improvement to the receiver also includes a second analog-to-digital converter which samples in time, delayed by one half chip from the sampling by the first analog-to-digital converter, the received spread-spectrum signal at approximately the chip rate, $f_c$, of one sample per chip. It is not necessary in this invention for the sampling clock frequency, $f_c$, to be exactly equal to the incoming chip rate, $f_c$. The delay of one half chip is a preferred embodiment but not a necessary condition.

A second matched filter is formed by the cooperative operation of the second shift register and the second adder tree, which together form an impulse response matched to the chip-sequence signal. The second analog-to-digital converter and the first analog-to-digital converter sample at the same sampling rate, namely the approximate chip rate, $f_c$, of one sample per chip.

The second shift register shifts the chips of the chip-sequence signal through the second shift register at the approximate chip rate, $f_c$. In response to the second ray having the chip-sequence signal aligned in the second shift register as determined by the header, the second output of the adder tree is stored, thereby detecting a second correlation signal.

This process is repeated for each significant ray as the analog-to-digital converter outputs are shifted into the shift registers. The headers of each ray determine when the significant rays are present in the registers, at which times the outputs of the adder tree should be stored, and the relative strength of the in-phase and quadrature-phase components of the rays.

A combiner combines all the first correlation signals of any one symbol using maximal-ratio combining, the coefficients of the combiner having been determined a priori by the strength of the headers.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Figure 1:
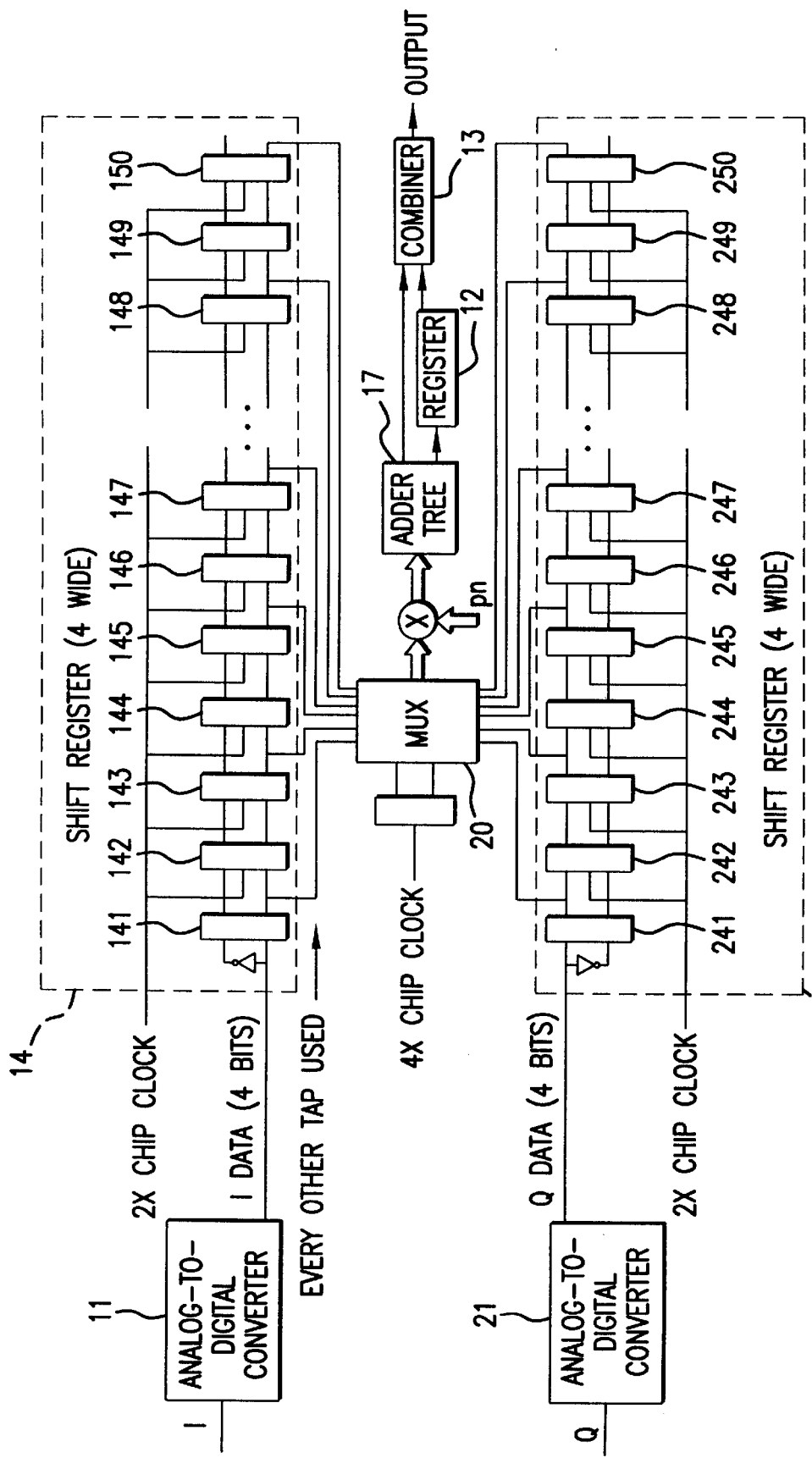
FIG. 1 is a block diagram of an improvement for a receiver employing sampling at twice the chip rate, for receiving two rays, due to multipath, of a received spread-spectrum signal, where no tracking loop is needed.

Reference now is made in detail to the present preferred embodiments of the invention, examples of which are illustrated in the accompanying drawings, wherein like reference numerals indicate like elements throughout the several views.

The present invention provides a novel improvement and method which can be used as part of a spread-spectrum receiver for receiving a received spread-spectrum signal in a multipath environment, where the receiver does not require a tracking loop. Multiple paths are received and the signal strengths of the multiple paths are combined using maximal-ratio combining techniques.

The present invention is taught as a system and method for receiving a plurality of rays including at least a first ray and a second ray, the plurality of rays being due to multipath. The present invention may be employed for receiving three or more rays due to multipath. The rays are of a received spread-spectrum signal which has a chip-sequence signal embedded therein, the received chip-sequence signal having a chip rate.

The received spread-spectrum signal is assumed to include a plurality of packets. Each packet has a header followed in time by data. The header is generated from spread-spectrum processing, by using techniques well known in the art, a header-symbol-sequence signal with a chip-sequence signal.

The header-symbol-sequence signal is a predefined sequence of symbols. Each symbol is formed by N chips, where N is sometimes referred to the processing gain (PG). The header-symbol-sequence signal may be a constant value, i.e., just a series of 1-bits or symbols, or a series of 0-bits or symbols, or alternating 1-bits and 0-bits or alternating symbols, or other predefined sequence as desired. The chip-sequence signal is user-defined and, in a typical practice, is used with a header-symbol-sequence signal.

The data part of the spread-spectrum packet is generated similarly, from techniques well known in the art as used for the header, by spread-spectrum processing a data-symbol-sequence signal with the chip-sequence signal. The data-symbol-sequence signal may be derived from data, or from an analog signal converted to data, signaling information, or other source of data symbols or bits. The chip-sequence signal can be user-defined, and preferably is orthogonal or nearly orthogonal to other spread-spectrum channels using the chip-sequence signal, as is well known in the art. The data sequence can be forward error correction (FEC) encoded to improve its error rate performance.

The improvement includes converter means, matched means, storage means and combiner means. The matched means is coupled between the converter means and the storage means. The combiner means is coupled to the matched means and to the storage means.

The converter means samples the received spread-spectrum signal at twice an approximate chip rate, $2 f_c$, or two samples per chip. The matched means shifts the chips of the chip-sequence signal at twice the approximate chip rate. The matched means has an impulse response matched to the chip-sequence signal. In response to the multipath rays having the chip-sequence signal aligned in the matched means, the matched means outputs a first correlation signal. The first correlation signal is stored in the storage means.

In response to the multipath rays having the chip-sequence signal delayed by one half a chip in the matched means, the matched means outputs a second correlation signal. The combiner means adds the first correlation signal from the storage means to the second correlation signal. This process is continued for each of the significant multipath rays. The significant rays are determined by the strength of the headers. The number of rays to be included in this process is left to the implementer. Typically, four rays is sufficient. However, using a matched filter for detection allows any number of rays to be detected without adding complexity to the implementation. Preferably, the combiner means uses maximal-ratio combining for combining the signals.

In the exemplary arrangement shown in FIG. 1, the converter means is embodied as an in-phase analog-to-digital converter 11 and a quadrature-phase analog-to-digital converter 21, the matched means is embodied as a matched filter, the storage means is embodied as a storage register 12, and the combiner means is embodied as a combiner 13. The matched filter includes an in-phase shift register 14 and a quadrature-phase shift register 24, a multiplexer 20 and an adder tree 17.

The in-phase shift register 14 is coupled to the in-phase analog-to-digital converter 11, and the quadrature-phase shift register 24 is coupled to the quadrature-phase analog-to-digital converter 21. The adder tree 17 is coupled through the multiplexer 20 to every other register of the in-phase shift register 14 and the quadrature-phase shift register 24. Separate adder trees can be used. However, if the devices were fast enough, a multiplexer 20 is employed to reduce the hardware components by sharing the adder tree from the multiple operations.

In FIG. 1, the adder tree 17 is coupled through the multiplexer 20 to the odd registers 141, 143, 145, 147, 149 of the in-phase shift register 14 and to the odd registers 241, 243, 245, 247, 249 of the quadrature-phase shift register 24. The storage register 12 is coupled to the adder tree 17. The combiner 15 is coupled to the adder tree 17 and to the storage register 12. The adder tree 17, in cooperation with the in-phase shift register 14 and the quadrature-phase shift register 24, has an impulse response which is matched to the chip-sequence signal.

The in-phase analog-to-digital converter 11 and the quadrature-phase analog-to-digital converter 21 sample the received spread-spectrum signal, by way of example, at twice the approximate chip rate, $2 f_c$, i.e., the Nyquist rate, of two samples per chip. The in-phase shift register 14 and the quadrature-phase shift register 24 shift the samples; that is, the chips from the in-phase analog-to-digital converter 11 and the quadrature-phase analog-to-digital converter 21, respectively, of the chip-sequence signal are shifted through the in-phase shift register 14 and the quadrature-phase shift register 24 at twice the approximate chip rate.

Assume that a first ray due to multipath is at the input to the receiver. In response to the first ray having the chip-sequence signal, which is embedded in the received spread-spectrum signal of the first ray, aligned in every other register, for example, the odd registers 141, 143, 145, 147, 149 of the in-phase shift register and the odd registers 241, 243, 245, 247, 249, of the quadrature-phase shift register 24, the adder tree 17 detects a first correlation signal.

The storage register 12 stores the first correlation signal.

Assume that a second ray due to multipath arrives at the input to the receiver delayed one-half chip from the first ray. In response to the second ray having the chip-sequence signal, which is embedded in the received spread-spectrum signal of the second ray, delayed by half a chip from the first ray and aligned in every other register, for example, the odd registers 141, 143, 145, 147, 149 of the in-phase shift register 14 and the odd registers 241, 243, 245, 247, 249 of the quadrature-phase shift register 24, the adder tree 17 detects the second correlation signal.

The combiner 13 combines the first correlation signal from the storage register 12 with the second correlation signal packet from the adder tree 17 using maximal-ratio combining. The coefficients of the combiner were previously stored and determined by the packet header. If more correlation signals were generated as a result of more multipath rays, these correlations would appear at different times as the signal is shifted into the registers 14 and 24. The multiple correlation signals would be stored in a register or other devices for storing the correlation signals. Then the combiner 13, coupled to the device for storing the correlation signals, would combine all of the correlation signals for each of the multipaths using maximal-ratio combining.

Figure 2:
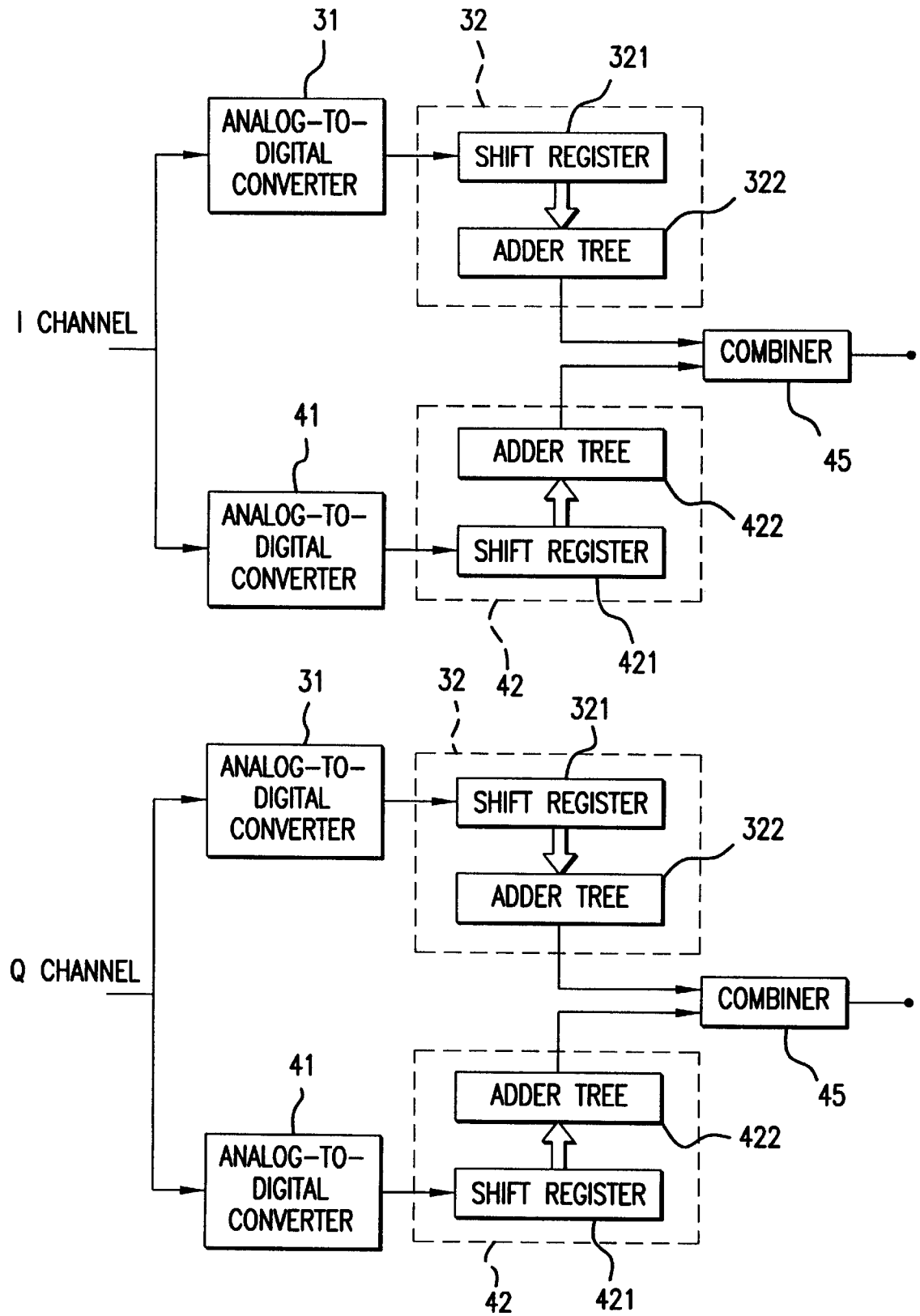
FIG. 2 is a block diagram of an improvement for a receiver employing two analog-to-digital converters and two matched filters, for receiving two rays, due to multipath, of a received spread-spectrum signal, where no tracking loop is needed.

In a second embodiment of the invention, shown in FIG. 2, the invention includes, for each of an in-phase channel and a quadrature-phase channel, a first analog-to-digital converter 31, a second analog-to-digital converter 41, a first matched filter 32, a second matched filter 42, and a combiner 45. For each of the in-phase channel and the quadrature-phase channel, the first matched filter 32 includes a first shift register 321 coupled to a first adder tree 322. For each of the in-phase channel and the quadrature-phase channel, the second matched filter 42 includes a second shift register 421 coupled to a second adder tree 422. The first adder tree 322, in cooperation with the first shift register 321, forms an impulse response of the first matched filter 32, which is matched to the chip-sequence signal. The second adder tree 422, in cooperation with the second shift register 421, forms an impulse response of the second matched filter 42 which is matched to the chip-sequence signal.

The discussion of FIG. 2 shall be directed to one of the channels, in-phase or quadrature-phase, but it will be understood that, in that the elements within each channel are the same, the discussion may be applied to describe either channel. If a particular element, such as the combiner 45, needs to be identified within a particular channel, it may be identified as the "in-phase" combiner 45 or as the "quadrature-phase" combiner 45. Similarly, reference may be made to an "in-phases" adder tree 422 as being distinguishable from a "quadrature-phase" adder tree 422.

The first shift register 321 is coupled to the first analog-to-digital converter 31. The second shift register 421 is coupled to the second analog-to-digital converter 41. The first adder tree 322 is coupled to each register of the first shift register 321. The second adder tree 422 is coupled to each register of the second shift register 421. The combiner 45 is coupled to the first adder tree 322 and to the second adder tree 422.

The first analog-to-digital converter 31 samples the received spread-spectrum signal at the chip rate, $f_c$, of one sample per chip. It is not necessary in this invention for the sampling clock frequency, $f_c$, to be exactly equal to the incoming chip rate, $f'_c$. The first shift register 321 receives the samples from the first analog-to-digital converter 31, with each sample representing a chip. The first shift register 321 shifts the chips of the chip-sequence signal through the first shift register 321 at the approximate chip rate, $f_c$.

The first adder tree 322, cooperatively with the first shift register 321, forms an impulse response matched to the chip-sequence signal. In response to the first ray having the chip-sequence signal, which is embedded in the received spread-spectrum signal of the first ray, aligned in the first shift register 321, the first adder tree 322 detects a first correlation signal.

The second analog-to-digital converter 41 samples the received spread-spectrum signal at the approximate chip rate, $f_c$, of one sample per chip. The sampling of the second analog-to-digital converter 41, however, is shifted in time by one half chip from the first analog-to-digital converter 31. Thus, the second analog-to-digital converter 41 is sampling at a delay of half a chip behind the first analog-to-digital converter 31.

The second shift register 421 shifts the samples, that is the chips of the chip-sequence signal which were embedded in the received spread-spectrum signal of the second ray, through the second shift register 421 at the approximate chip rate, $f_c$.

The second adder tree 422, in cooperation with the second shift register 421, has an impulse response which is matched to the chip-sequence signal. In response to the second ray having the chip-sequence signal, which is embedded in the received spread-spectrum signal, aligned in the second shift register 421, the second adder tree 422 detects a second correlation signal.

The combiner 45 combines the first correlation signal with the second correlation signal. In the preferred embodiment, the combiner uses maximal-ratio combining, the coefficients of the combiner having been determined a priori by the strength of the headers preceding each packet.

An alternative embodiment of the invention includes a method for receiving a plurality of rays including at least a first ray and a second ray, due to multipath, of a received spread-spectrum signal. The received spread-spectrum signal has a chip-sequence signal with a chip rate, $f'_c$.

The method comprises the steps of sampling the received spread-spectrum signal at an approximate chip rate, $f_c$, of one sample per chip, and shifting chips of the chip-sequence signal embedded in the received spread-spectrum signal at the approximate chip rate, $f_c$, through a first shift register. It is not necessary in this invention for the sampling clock frequency, $f_c$, to be exactly equal to the incoming chip rate, $f'_c$.

In response to the first ray having the chip-sequence signal aligned in the first shift register, the method detects a first correlation signal. The method further includes sampling, shifted in time by one half chip from the first sampling, the received spread-spectrum signal at the approximate chip rate, $f_c$, of one sample per chip and shifting the chips of the chip-sequence signal through a second shift register at the approximate chip rate, $f_c$. In response to the second ray having the chip-sequence signal aligned in the second shift register, the method detects a second correlation signal. The method then combines, using maximal-ratio combining, the first correlation signal and the second correlation signal.

Alternatively, the method for receiving a first ray and a second ray includes the steps of sampling the received spread-spectrum signal at twice the approximate chip rate, $2f_c$, or two samples per chip, and shifting the chips of the chip-sequence signal through a shift register at twice the chip rate.

In response to a first ray having the chip-sequence signal aligned in every other register of the shift register, with the shift register and an adder tree cooperatively having an impulse response matched to the chip-sequence signal, the method detects a first correlation signal. The method stores the first correlation signal.

In response to the second ray having the chip-sequence signal delayed a half chip from the first ray and aligned in every other register of the shift register, the method detects a second correlation signal. The method then combines the first correlation signal and the second correlation signal using maximal-ratio combining. For more than two rays, the correlated signals would appear at different times. The signal is shifted into registers 321 and 421. All the rays can then be combined in a maximal-ratio method.

As just described, in this invention the incoming chips are sampled two or more times per chip. Chips sampled by the first analog-to-digital converter go to the first matched filter, chips sampled by the second analog-to-digital converter go to the second matched filter, etc. Two matched filters are used in the preferred embodiment to maximize the performance/cost ratio. The result is shown in FIG. 2.

Figure 3:
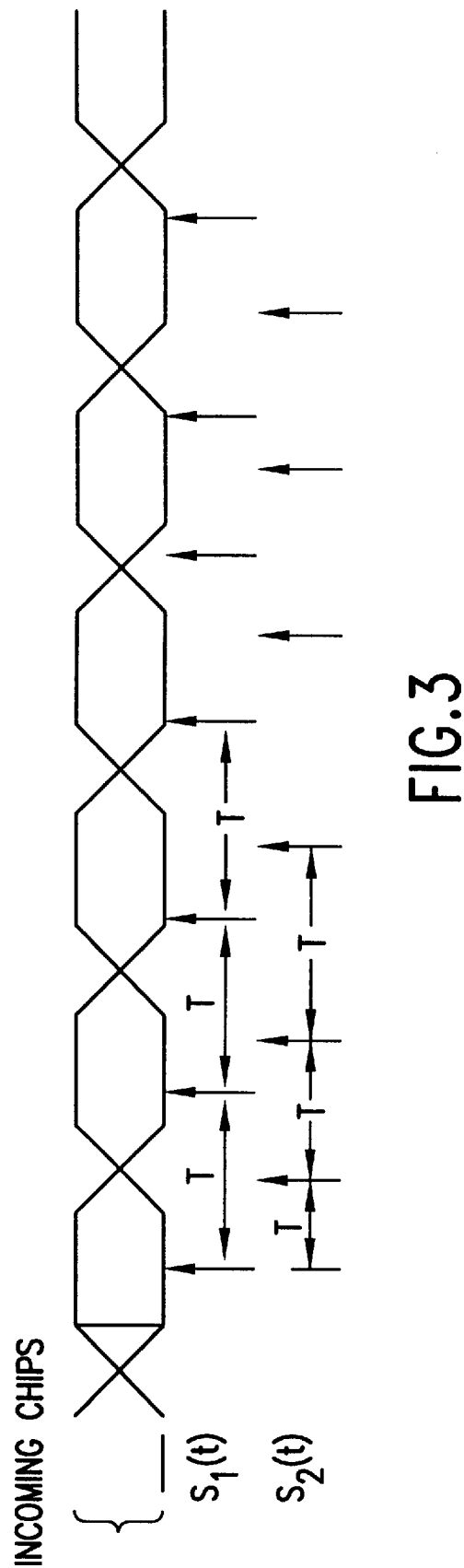
FIG. 3 illustrates timing for sampling a first ray and a second ray, due to multipath, of a received spread-spectrum signal.

FIG. 3 shows that when $T_c > T$, i.e., the incoming chip rate is less than the local chip rate, the output of the first matched filter will give good estimates, then bad estimates, and then good estimates again. By setting $T_1 = T/2$, when the first matched filter yields a poor quality result, due to the fact that samples are taken during the signal's transition, the second matched filter yields a good result, since samples are taken near the center of the chip.

To optimally combine the outputs of the first matched filter and the second matched filter, maximal-ratio combining should be used. The frame of incoming data includes a header followed by data bits. Since the chip rates may differ by, say 10 ppm, the invention "slides" by one chip every 100,000 chips. If the header repeats, say every 10,000 chips, little slipping occurs between headers. The headers in the first matched filter and the second matched filter, $H_1$ and $H_2$, respectively, are measured and multiplied by the bit stream from the first matched filter and the second matched filter, $B_{i1}$ and $B_{i2}$, respectively (the $i^{th}$ bit). Then the combined output is $H_1 B_{i1} + H_2 B_{i2} = V_0$, bit i.

When multipath exists, a previous patent indicates that the output of the first matched filter is $V_{01,i} = H_{i11} B_{i11} + H_{12} B_{i12} + \ldots$ When $H_{1j}$ is the $j_{th}$ multipath header output of the first matched filter, $B_{i1j}$ is the $j^{th}$ multipath output of bit i from the first matched filter and $V_{01,i}$ is the RAKE output of bit i at the first matched filter. Then the combination of the first matched filter and the second matched filter yields $$V_0 = V_{01,i} + V_{02,i}$$

Again, these results do not require that the incoming and local chip rates be the same. An offset of ten or thirty parts per million is acceptable and does not result in performance degradation.

It will be apparent to those skilled in the art that various modifications can be made to the spread spectrum system requiring no tracking of the instant invention without departing from the scope or spirit of the invention, and it is intended that the present invention cover modifications and variations of the spread spectrum system requiring no tracking provided they come within the scope of the appended claims and their equivalents.

We claim:

1. An improvement to a spread-spectrum receiver for receiving multiple rays, due to multipath, of a received spread-spectrum signal and for maintaining data integrity without a tracking loop, the received spread-spectrum signal having a chip-sequence signal with a chip rate, $f_c$, the multiple rays including a first ray and a second ray, comprising:

an analog-to-digital converter for sampling the received spread-spectrum signal at at least twice an approximate chip rate, $2 f_c$, of two samples per chip;

a shift register, coupled to said analog-to-digital converter, for shifting chips of the chip-sequence signal through said shift register at twice the approximate chip rate;

an adder tree, coupled to every other odd register of said shift register, with said shift register and said adder tree cooperatively having an impulse response matched to the chip-sequence signal, said shift register and said adder tree, responsive to the first ray having the chip-sequence signal aligned in every other odd register of said shift register, for detecting a first correlation signal, and said shift register and said adder tree, responsive to the second ray having the chip-sequence signal delayed approximately a half chip from the first ray and aligned in every other odd register of said shift register, for detecting a second correlation signal;

a storage register for storing the first correlation signal; and a combiner, coupled to said adder tree and to said storage register, for maximal-ratio combining the first correlation signal with the second correlation signal.

2. The improvement to the receiver as set forth in claim 1, with:

said adder tree responsive to a third ray having the chip-sequence signal delayed approximately a half chip from the second ray and aligned in every other odd register of said shift register, for detecting a third correlation signal;

said storage register for storing the first correlation signal and the second correlation signal; and said combiner for maximal-ratio combining the first correlation signal, the second correlation signal and the third correlation signal.

3. The improvement to the receiver as set forth in claim 2, with:

said adder tree responsive to a fourth ray having the chip-sequence signal delayed approximately a half chip from the second ray and aligned in every other odd register of said shift register, for detecting a fourth correlation signal;

said storage register for storing the first correlation signal, the second correlation signal and the third correlation signal; and said combiner for maximal-ratio combining the first correlation signal, the second correlation signal, the third correlation signal and the fourth correlation signal.

4. An improvement to a spread-spectrum receiver for receiving a plurality of rays, due to multipath, of a received spread-spectrum signal and for maintaining data integrity without a tracking loop, the received spread-spectrum signal having a chip-sequence signal with a chip rate, $f'_c$, the plurality of rays including a first ray and a second ray, comprising:

converter means for sampling the received spread-spectrum signal at at least twice an approximate chip rate, $2 f_c$, of two samples per chip;

register means for shifting chips of the chip-sequence signal through said register means at twice the approximate chip rate;

adder means, coupled to every other odd register of said register means, with said register means and said adder tree cooperatively having an impulse response matched to the chip-sequence signal, said register means and said adder means, responsive to the first ray having the chip-sequence signal aligned in every other odd register of said register means, for detecting a first correlation signal, and said register means and said adder means, responsive to the second ray having the chip-sequence signal delayed a half chip from the first ray and aligned in every other odd register of said shift register, for detecting a second correlation signal;

storage means for storing the first correlation signal; and combiner means for maximal-ratio combining the first correlation signal with the second correlation signal.

5. The improvement to the receiver as set forth in claim 4, with:

said adder means responsive to a third ray having the chip-sequence signal delayed approximately a half chip from the second ray and aligned in every other odd register of said shift: register, for detecting a third correlation signal;

said storage means for storing the first correlation signal and the second correlation signal; and said combiner means for maximal-ratio combining the first correlation signal, the second correlation signal and the third correlation signal.

6. The improvement to the receiver as set forth in claim 5, with:

said adder means responsive to a fourth ray having the chip-sequence signal delayed approximately a half chip from the third ray and aligned in every other odd register of said shift register, for detecting a fourth correlation signal;

said storage means for storing the first correlation signal, the second correlation signal and the third correlation signal; and said combiner means for maximal-ratio combining the first correlation signal, the second correlation signal, the third correlation signal and the fourth correlation signal.

7. A method for receiving multiple rays, due to multipath, of a received spread-spectrum signal and for maintaining data integrity without a tracking loop, the received spread-spectrum signal having a chip-sequence signal with a chip rate, the multiple rays including a first ray and a second ray, comprising the steps of:

sampling the received spread-spectrum signal at at least twice an approximate chip rate;

shifting chips of the chip-sequence signal through a shift register at twice the approximate chip rate;

detecting, in response to the first ray having the chip-sequence signal aligned in every other odd register of said shift register, a first correlation signal;

detecting, in response to the second ray having the chip-sequence signal delayed a half chip from the first ray and aligned in every other odd register of said shift register, a second correlation signal;

storing the first correlation signal; and maximal-ratio combining the first correlation signal with the second correlation signal.

8. The method as set forth in claim 7 further comprising the steps of repeating the steps of claim 7 for all of the multiple rays that can be detected in the shift register.

9. The method as set forth in claim 8, further comprising the steps of:

detecting, in response to a third ray having the chip-sequence signal delayed approximately a half chip from the second ray and aligned in every other odd register of said shift register, a third correlation signal;

storing the first correlation signal and the second correlation signal; and maximal-ratio combining the first correlation signal, the second correlation signal and the third correlation signal.

10. The method as set forth in claim 9, further comprising the steps of:

detecting, in response to a fourth ray having the chip-sequence signal delayed approximately a half chip from the third ray and aligned in every other odd register of said shift register, a fourth correlation signal;

storing the first correlation signal, the second correlation signal and the third correlation signal; and maximal-ratio combining the first correlation signal, the second correlation signal, the third correlation signal and the fourth correlation signal.

* * * * *